United States Patent
Radu et al.

(10) Patent No.: US 6,929,309 B1
(45) Date of Patent: Aug. 16, 2005

(54) AUTOMOTIVE DOOR TRIM ASSEMBLY WITH REMOVABLE ACCESS PANEL

(75) Inventors: Bogdan Radu, Dearborn, MI (US); John D. Youngs, Southgate, MI (US); Mark Heinze, Clarkston, MI (US); James Gregory, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 33 days.

(21) Appl. No.: 10/709,633

(22) Filed: May 18, 2004

(51) Int. Cl.[7] .................................................. B60J 5/00
(52) U.S. Cl. ..................................... 296/146.7; 296/153
(58) Field of Search ............................. 296/146.1, 153, 296/146.7

(56) References Cited

U.S. PATENT DOCUMENTS

| | | | |
|---|---|---|---|
| 4,882,842 A | 11/1989 | Basson et al. ................. 29/857 |
| 4,919,470 A | 4/1990 | Muller ........................ 296/153 |
| 6,085,483 A * | 7/2000 | Kurosaki ................. 296/146.7 |
| 6,308,488 B1 * | 10/2001 | Hoshino ................... 296/146.7 |
| 6,546,674 B1 | 4/2003 | Emerling et al. ............. 49/502 |
| 6,616,216 B2 | 9/2003 | Furuyama et al. ....... 296/146.7 |
| 6,676,324 B1 | 1/2004 | Pleiss ........................... 403/33 |
| 2003/0001408 A1 | 1/2003 | Hockenberry et al. ... 296/146.7 |

* cited by examiner

*Primary Examiner*—Jason Morrow
(74) *Attorney, Agent, or Firm*—Bill C. Panagos

(57) ABSTRACT

An automotive door trim assembly includes an interior door trim panel with an access opening that facilitates installing and servicing various accessories installed within the interior of an automotive door, between the door's exterior skin and the interior trim panel. The access opening is covered by an access panel that is slidably coupled to the interior trim panel for movement between a first position wherein the access panel is removable from the door trim panel to expose the access opening, and a second position wherein the access panel is secured to the door trim panel and covers the access opening. The access panel is coupled to the interior trim panel by cooperating first connecting members disposed on the interior trim panel and second connecting members disposed on the access panel.

14 Claims, 2 Drawing Sheets

AUTOMOTIVE DOOR TRIM ASSEMBLY WITH REMOVABLE ACCESS PANEL

FIELD OF INVENTION

The present application relates generally to automotive interiors, and more particularly to an automotive door trim assembly.

BACKGROUND OF THE INVENTION

Conventional automotive doors are manufactured in a modular fashion wherein an outer skin, or exterior panel, is secured to one side of a structural door frame and an interior trim panel is secured to the opposite side of the door frame. Various door accessories are installed within the interior of the door, generally between the exterior panel and the interior trim panel. For example, door accessories typically include a window lift assembly, locks, speakers, door operating and opening mechanisms, and other components. Because access to the interior door accessories may be required during assembly, or when service is necessary, the interior door trim panel is often equipped with a removable access cover to facilitate service and/or removal of the interior door accessories without requiring the interior door trim to be completely removed from the door frame. Typically, the removable access panel is secured to the interior door frame by push-type retaining clips, wherein the access panel may be positioned over an access opening in the interior door trim panel and force applied normal to the plane of the door and the access panel to force the retaining clips into frictional engagement with corresponding apertures formed in the interior door trim panel. Often, the access panel will support a conventional armrest and a handle for closing the door.

One drawback of conventional access panels is that they are susceptible to improper or incomplete engagement of the clips with the corresponding apertures in the interior trim panel due to the fact that the interior door trim panel and the access panel are relatively flexible. When the clips are improperly engaged, the access panel may be loosely secured to the trim panel or may be perceived as being warped. Another drawback of conventional access panels for interior door trims is that they are susceptible to being prematurely dislodged from the interior trim panel if too much force is applied to the access panel in a direction normal to the panel, such as when the automobile door is being pulled closed. A need therefore exists for an interior door trim assembly having a removable access panel that overcomes drawbacks of the prior art, such as those described above.

SUMMARY OF INVENTION

The present invention provides an automotive door trim assembly comprising an interior door trim panel having an access opening for facilitating the installation and servicing of door accessories within a door assembly without requiring the entire trim panel to be removed from the door frame. An access panel is coupled to the door trim panel, over the access opening and is secured to the interior trim panel by first and second connecting members respectively disposed on the door trim panel and access panel. The access panel is slidably movable relative to the trim panel between a first position wherein the access panel is removable from the door trim panel to expose the access opening, and a second position wherein the access panel is secured or locked on the door trim panel to cover the access opening. The sliding movement of the access panel is along a direction parallel to the surface of the trim panel and therefore will not be prematurely dislodged when force is applied to the access panel in a direction normal to the access panel, such as when the automobile door is pulled closed by a passenger.

The first and second connecting members may integrally formed with the trim panel and the access panel, or may be separate components installed on the respective panels. The first and second connecting members may further include interlocking portions that cooperate to positively lock the access panel in the closed position. In one embodiment, the access panel has one or more flanges extending outward from the periphery of the access panel, and additional connecting members are provided on the flanges.

In another embodiment of the invention, an automotive door assembly includes a door frame, an exterior panel coupled to the door frame, and an interior door trim assembly as described above coupled to the door frame, generally opposite the exterior panel. In yet another embodiment, a method of securing an access panel over an opening in an interior door trim panel includes, positioning the access panel proximate the opening, sliding the access panel relative to the door trim panel and in a direction parallel to a planar surface of the door trim panel, and respective connectors on the door trim panel and the access panel while sliding the access panel.

The features and objectives of the present invention will become more readily apparent from the following Detailed Description taken in conjunction with the accompanying drawings.

BRIEF DESCRIPTION OF DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
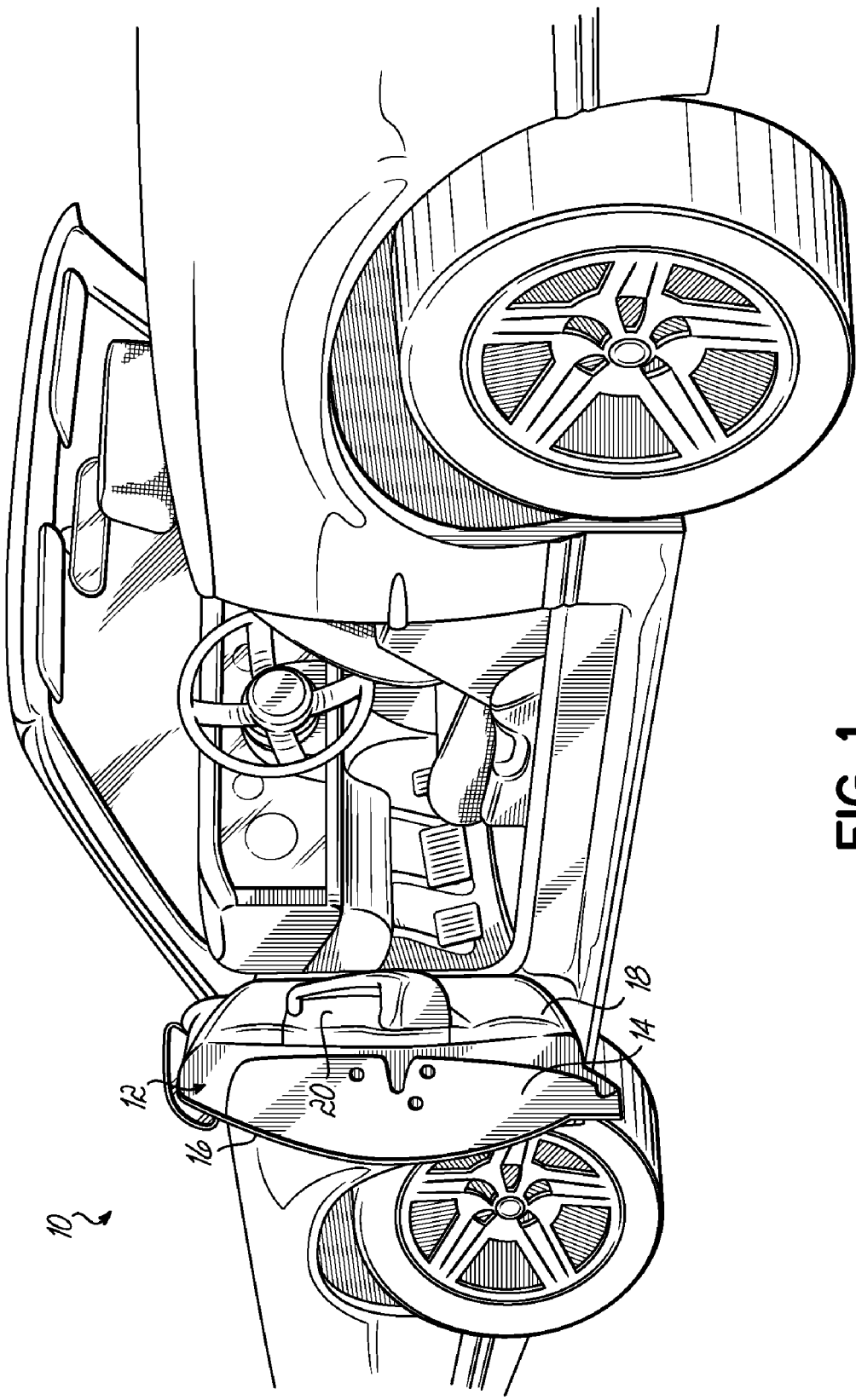
FIG. 1 is a perspective view of an automobile, including an exemplary door trim panel of the present invention.

Referring to FIG. 1, there is shown a conventional automobile 10 having an automotive door assembly 12 with an interior door trim panel 18 according to the present invention. The door assembly 12 includes a structural frame 14 to which an exterior panel, or skin, 16 is secured on an outwardly facing side of the frame 14, as known in the art. The interior door trim panel 18 is secured to the frame 14 on the interior facing side of the door assembly 12, also as known in the art. The door assembly 12 is hingedly coupled to the automobile chassis for selective movement between open and closed positions.

Figure 2:
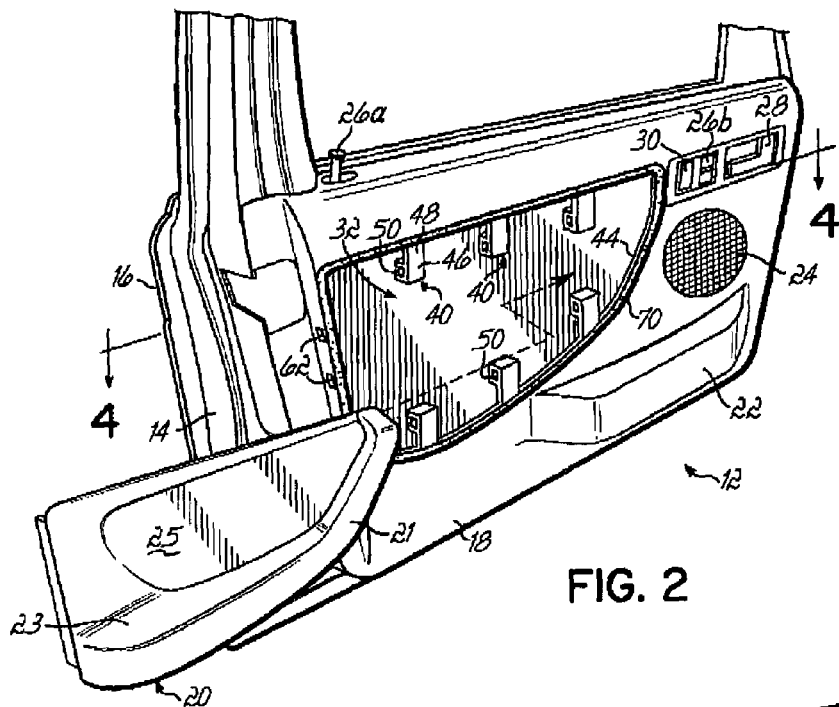
FIG. 2 is an exploded perspective view of the interior door trim panel of FIG. 1.
Figure 3:
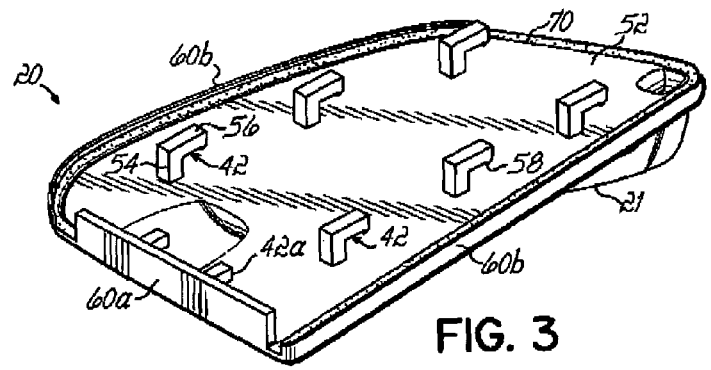
FIG. 3 is a perspective view of the back side of the removable access panel depicted in FIG. 2.

Referring now to FIGS. 2 and 3, the interior door trim panel 18 is shown in greater detail. The interior trim panel 18 includes various accessories provided on or installed through the trim panel 18, such as a map pocket 22, a speaker grille 24, door locking components 26a, 26b, door opening components 28 and window opening components 30. In the embodiment shown, the interior trim panel 18 further includes an access opening 32 formed through the trim panel 18 to facilitate servicing and/or installing or removing the various door accessories 22, 24, 26a, 26b, 28, 30 without requiring the trim panel 18 to be completely removed from the door frame 14. The door assembly 12 also includes an access panel 20 that is secured to the trim panel 18 over the access opening 32. The access panel 20 includes a handle portion 21 and an armrest portion 23 formed on its front, or interiorly facing, side surface 25. The access panel 20 is removably secured over the access opening 32 by cooperating first and second connecting members 40, 42 respectively disposed on the interior door trim panel 18 and the access panel 20. In the embodiment shown in FIG. 2, the first connecting members 40 are integrally formed with the interior trim panel 18 and comprise bosses 46 that are offset from the peripheral edge 44 of the access opening 32 and toward an interior portion of the access opening 32 by inwardly extending tabs 48. Apertures 50 are formed through the bosses 46, along directions parallel to the surface of the interior trim panel 18.

Figure 4:
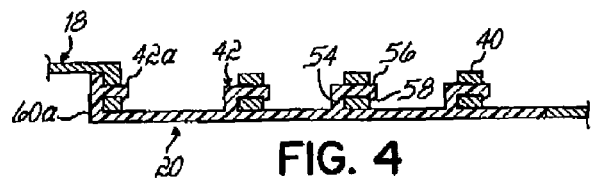
FIG. 4 is a partial cross-sectional view of the interior door trim panel of FIG. 2, taken along lines 4—4, with the access panel installed.

With continued reference to FIG. 2 and referring further to FIGS. 3 and 4, the back side 52 of the access panel 20 includes second connecting members 42 configured to slidably engage the first connecting members 40 on the interior trim panel 18, whereby the access panel 20 can be secured to the interior door trim panel 18 by positioning the access panel 20 adjacent the opening 32 and sliding the access panel 20 generally along a direction parallel to the surface of the door trim panel 18. The access panel 20 is slidable between a first position wherein access panel 20 is removable from the interior trim panel 18 to expose the access opening 32, and a second position wherein the second connecting members 42 engage the first connecting members 40 to secure access panel 20 to the interior trim panel 18 to cover the access opening 32.

In the embodiment shown, the second connecting members 42 comprise base portions 54 extending outwardly from the back side 52 of the access panel 20, and upper portions 56 extending substantially parallel to the back side 52. The upper portions 56 are slidably received in the apertures 50 formed in the first connecting members 40. The distal ends of the upper portions 56 are formed with detents 58 which snap through the apertures 50 of the first connecting members 40 to provide a positive lock engagement between the first and second connecting members 40, 42 when the access panel 20 is properly positioned over the access opening 32.

In the embodiment shown in FIGS. 2–4, the second connecting members 42 are integrally formed with the access panel 20. It will be recognized, however, that either or both of the first and second connecting member 40, 42 may alternatively be separate components that are attached to the respective panels 18, 20.

The access panel 20 further includes flanges 60a, 60b formed around the peripheral edge of the access panel 20 and extend outwardly from access panel 20. The flanges 60a, 60b provide structural rigidity to the access panel 20 to help resist bending of the access panel 20. In addition, one or more supplemental second connecting members 42a may be provided on the flange 60a, as depicted in FIGS. 3 and 4, to engage corresponding apertures 62 formed directly into the interior trim panel 18.

While FIGS. 2–4 depict the access panel 20 as being completely removable from the interior trim panel 18, it will be recognized that the access panel 20 may alternatively be configured to remain movably attached to the interior trim panel 18. In such an embodiment, the access panel 20 may be slidably disengaged from the first connecting members 40 for movement of the access panel 20 from a closed position covering the access opening 32, to an open position wherein the interior space between the exterior panel 16 and interior trim panel 18 may be accessed via the access opening 32. As a non-limiting example, the access panel 20 may be tethered at one end to the interior trim panel 18 by elongate supplemental second connecting members 42a provided on upturned flange member 60a, whereby the supplemental second connecting members 42a on flange member 60a remain engaged with apertures 62 formed through the interior trim panel 18 while other second connecting member 42 are disengaged for respectively associated first connecting members 40 so that access panel 20 can be swung away from the access opening 32.

The access panel 20 further includes a sealing member 70, such as foam gasket material, disposed around the peripheral edge of the access panel 20, as depicted in FIG. 3. When the access panel 20 is secured to the interior trim panel 18, the sealing material 70 provides a tight seal between the access panel 20 and the interior trim panel 18 to reduce or eliminate noise and air flow which might otherwise be transmitted into the passenger compartment of the automobile. While the sealing material 70 is depicted in FIG. 3 as being provided on the access panel 20, it will be recognized that the sealing material 70 may alternatively be provided around the perimeter of the access opening 32, as depicted in FIG. 2.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive door trim assembly, comprising:

an interior door trim panel adapted to be secured to an automobile door;

an access opening formed in said door trim panel and sized to facilitate the installation and servicing of door accessories within the interior of the automobile door;

a plurality of first connecting members disposed on said door trim panel, proximate said access opening;

an access panel slidably coupled to said door trim panel, proximate said access opening, for movement between a first position wherein said access panel is removable from said door trim panel to expose said access opening, and a second position wherein said access panel is secured to said door trim panel and covers said access opening; and a plurality of second connecting members disposed on said access panel, said second connecting members slidably engaging said first connecting members when said access panel is moved in a direction parallel to a surface of said door trim panel to thereby retain said access panel on said door trim panel.

2. The door trim assembly of claim 1, wherein said first connecting members are integrally formed with said door trim panel.

3. The door trim assembly of claim 1, wherein said second connecting members are integrally formed with said access panel.

4. The door trim assembly of claim 1, wherein said first and second connecting members comprise respective interlocking portions that cooperate to positively lock said access panel in said second position.

5. The door trim assembly of claim 4, wherein said interlocking portions include detents formed on one of said first and second connecting members.

6. The door trim assembly of claim 1, further comprising a sealing member disposed between said door trim panel and said access panel, proximate said access opening.

7. The door trim assembly of claim 6, wherein said sealing member is carried on said access panel.

8. The door trim assembly of claim 6, wherein said sealing member is carried on said door trim panel.

9. The door trim assembly of claim 1, further comprising an armrest supported on said access panel.

10. The door trim assembly of claim 1, wherein said access panel further comprises:
    a peripheral edge circumscribing said access panel; and
    a flange extending outwardly from said access panel, proximate at least a portion of said peripheral edge.

11. The door trim assembly of claim 10, further comprising:
    a second connecting member formed on said flange.

12. An automotive door assembly, comprising:
    a door frame adapted to be hingedly mounted to an automobile;
    an exterior door panel coupled to said door frame; and
    an interior door trim assembly coupled to said door frame, generally opposite said exterior door panel, and comprising:
        an interior door trim panel,
        an access opening formed in said door trim panel and sized to facilitate the installation and servicing of door accessories within the interior of the automotive door assembly,
        a plurality of first connecting members disposed on said door trim panel, proximate said access opening,
        an access panel slidably coupled to said door trim panel, proximate said access opening, for movement between a first position wherein said access panel is removable from said door trim panel to expose said access opening, and a second position wherein said access panel is secured to said door trim panel and covers said access opening, and
        a plurality of second connecting members disposed on said access panel, said second connecting members slidably engaging said first connecting members when said access panel is moved in a direction parallel to a surface of said door trim panel to thereby retain said access panel on said door trim panel.

13. A method of securing an access panel proximate an access opening in an interior door trim panel, the access opening sized to facilitate the installation and servicing of door accessories within the interior of an automobile door, the method comprising:
    positioning the access panel proximate the access opening;
    sliding the access panel relative to the door trim panel, generally along a direction parallel to a planar surface of the door trim panel; and
    engaging connectors on the access panel with corresponding connectors on the door trim panel while sliding the access panel relative to the door trim panel.

14. The method of claim 13, further comprising:
    sliding the access panel relative to the door trim panel to disengage the connectors on the access panel from the connectors on the door trim panel; and
    moving the access panel relative to the door trim panel to expose the opening in the door trim panel.

* * * * *